United States Patent [19]
Pfost et al.

[11] 4,024,379
[45] May 17, 1977

[54] BINARY SYSTEM FOR MAGNETIC CARD ACTUATION FOR LAUNDRY MACHINES

[75] Inventors: R. Fred Pfost; Eric G. Breeze, both of Los Altos, Calif.

[73] Assignee: Service Distributors, Inc., San Francisco, Calif.

[22] Filed: May 19, 1975

[21] Appl. No.: 578,652

[52] U.S. Cl. .................. 235/61.7 B; 235/61.11 D; 360/40; 360/51

[51] Int. Cl.² .................. G06K 5/00; G06K 7/08; G11B 5/09

[58] Field of Search ........... 235/61.11 D, 61.12 M, 235/61.7 B; 360/2, 39, 40, 51, 53; 340/149 A

[56] References Cited

UNITED STATES PATENTS

| | | | |
|---|---|---|---|
| 3,683,413 | 8/1972 | Schlaepfer | 360/2 |
| 3,697,729 | 10/1972 | Edwards et al. | 235/61.7 B |
| 3,750,828 | 8/1973 | Constable | 235/61.7 B |
| 3,845,277 | 10/1974 | Voss et al. | 235/61.7 B |

Primary Examiner—Daryl W. Cook
Attorney, Agent, or Firm—Julian Caplan

[57] ABSTRACT

A control system is described for activating a machine using magnetic signals encoded on a magnetic card, tape or equivalent member. The magnetic signals are pulse-width-modulated and, in one embodiment, also sawtooth-modulated. A means is provided which is responsive to the magnetic signals for generating a first and a second number. The first number corresponds to the number of times the magnetic card is usable for activating a machine. The second number is provided for identification and validation purposes. Means are also provided for reducing the number of times the card can be used each time it is used to activate a machine and for visually displaying that number on a visual display device. The use of skewed recording and reproduction heads is also described for improving signal discrimination and security against the usability of fraudulently produced magnetic cards.

15 Claims, 22 Drawing Figures

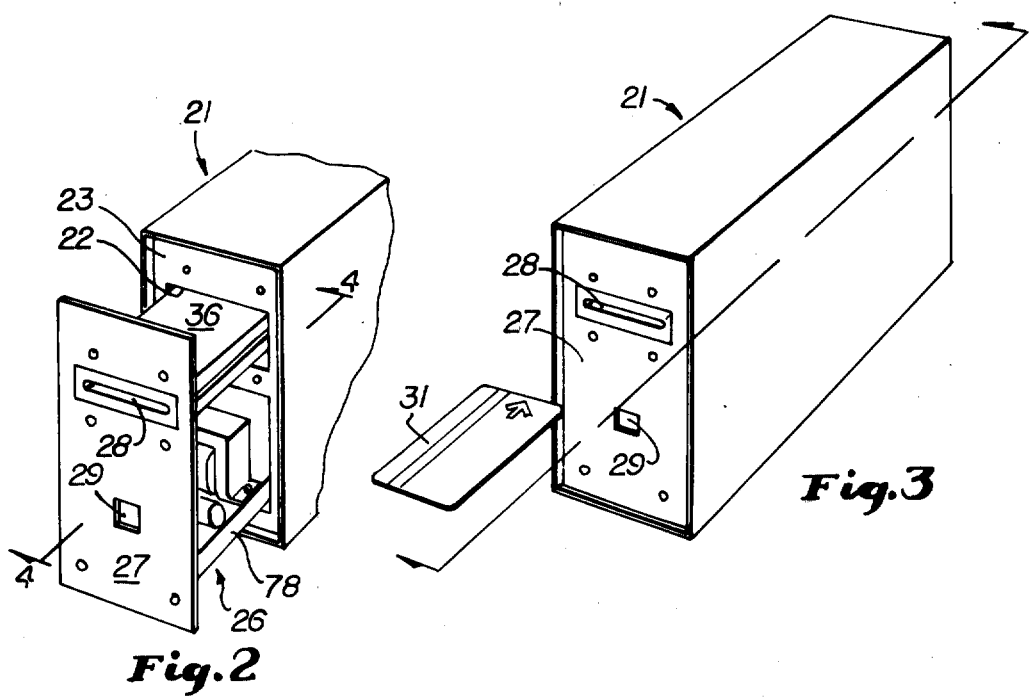
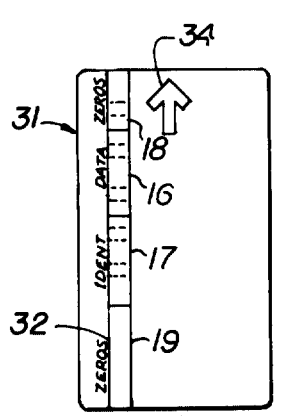
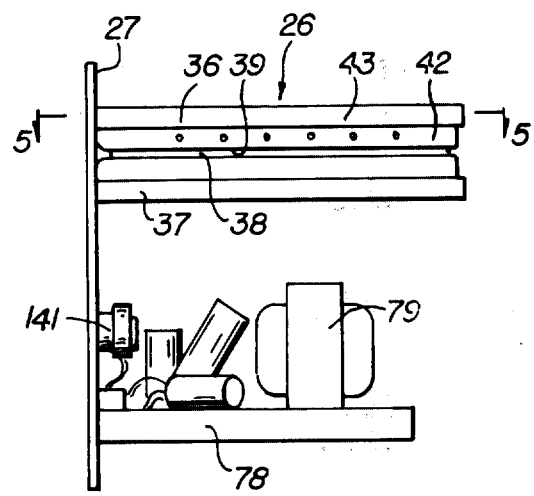

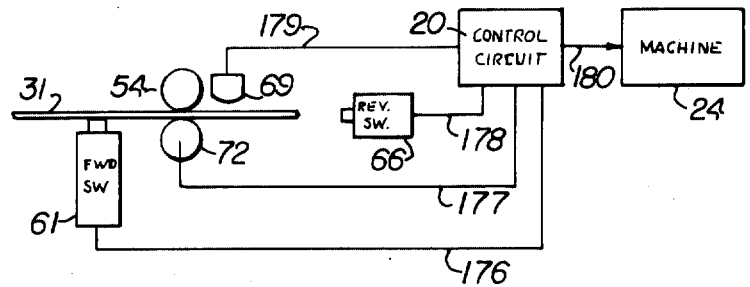
Fig. 12
Fig. 13
ONE BIT CELL   ZERO BIT CELL
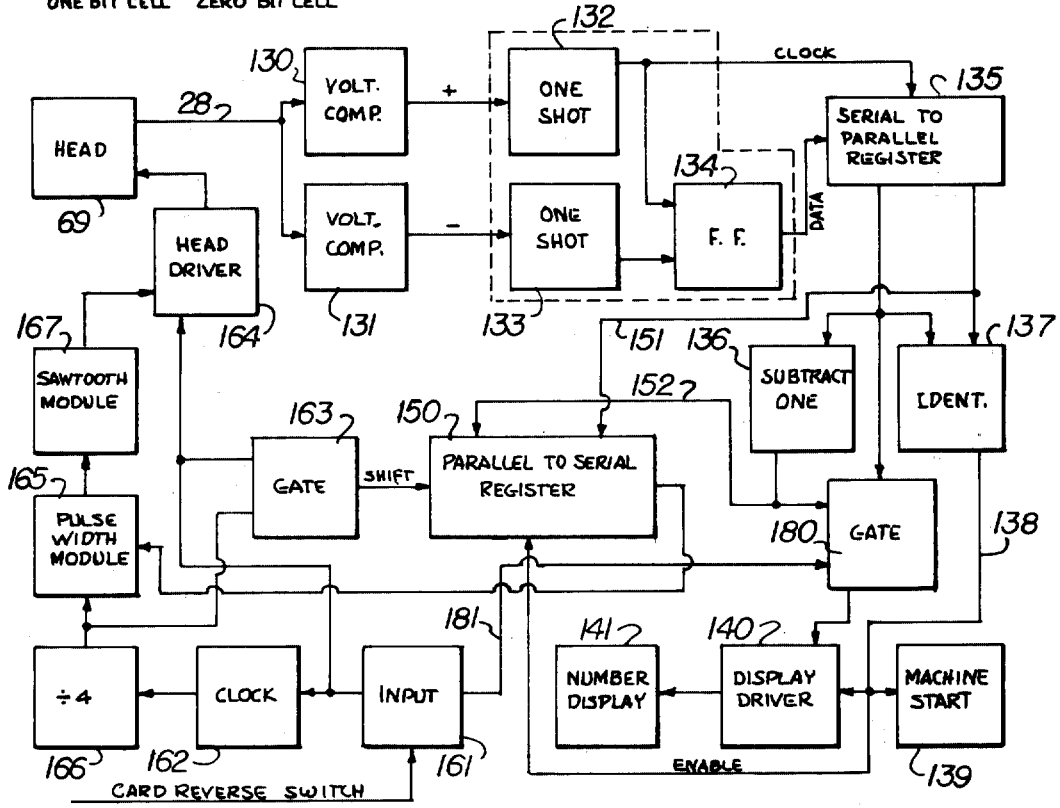
Fig. 14

BINARY SYSTEM FOR MAGNETIC CARD ACTUATION FOR LAUNDRY MACHINES

BACKGROUND OF THE INVENTION

The present invention relates in general to control systems for activating machines and in particular to a ticket acceptor and validation apparatus for use with a card, tape or the like encoded with magnetic signals.

Most vending machines, laundry and dry cleaning machines and the like which are provided for public use are coin-operated. Many of these machines are made available 24 hours a day and consequently are unattended or are supervised only at great cost. Because of the presence of coins in these machines, the machines have been and are, with increasing frequency in recent years, subject to a great deal of vandalism. The economic losses which have resulted have not been limited to a loss of the coins, but have included additional expenses necessitated by repairs to the damaged control units and coin boxes and the losses associated with machines being operable for long periods of time while the repairs are being made.

There is also associated with a great many coin-operated mechanisms the problem of a lack of adjustability to accept coins of different denominations. Typically, whenever a change is made in the number or type of coins required to operate such mechanisms, the entire mechanism must be replaced. There are mechanisms which accept various combinations of coins and provide change; however, they are generally quite expensive and are typically limited to accepting nickels, dimes and quarters.

In certain foreign countries, paper currency is widely used in denominations corresponding closely to the cost of obtaining goods and services from a machine. Like the more expensive coin-operated mechanisms, a mechanism operable with paper currency is undesirably expensive.

Heretofore, a number of proposals have been made for using a ticket or a card in lieu of coins for activating machines. In one such proposal, a ticket of thermoplastic material is employed as a substrate. On the substrate, there is provided a printed circuit. An apparatus detects the presence of the printed circuit and, if the ticket is valid, activates a machine and destroys the ticket. This is an excellent solution to the problem of vandalism of machines and machine coin boxes, but, unfortunately, each use requires a separate ticket and such tickets tend to be easily duplicated.

Cards bearing magnetic signals, on the other hand, may be used repeatedly for activating a machine by means of an apparatus which records on the card appropriate signals each time the card is used and returning the card to the user. The number of times the card may be used is readily controllable.

Presently, such cards are used repeatedly in locking mechanisms for gaining access to secured areas. Cards of this type are also used for gaining access through turnstiles, as in a subway system. Typically, in the latter case, computers are employed to read an amount encoded on the card. The amount is reduced according to predetermined criteria and a lesser amount recorded on the card in place of the previously encoded amount. While appropriate for large installations, and providing relatively security against fraudulent duplication of cards, the cost and complexity of such computer-augmented control systems mitigate their use in apparatus for controlling the activation of individual vending machines, laundry and dry cleaning machines and the like. Consequently, it is desirable to not only have a relatively inexpensive means for using magnetic cards for operating machines but to have a means by which such cards can be used with a reasonable degree of security against fraudulently produced cards.

SUMMARY OF THE INVENTION

In view of the foregoing, a principal object of the invention is a relatively inexpensive but reliable and secure control apparatus for activating a machine using a magnetic card, tape or the like bearing magnetic signals.

Another object of the invention is an apparatus of the type described above including means for modifying the signals on the card such that the same card may be used repeatedly for activating a machine.

A further object of the invention is a control apparatus of the type described above which uses a card bearing magnetic signals for activating venting machines, laundry and dry cleaning machines and the like which is relatively difficult to fraudulently duplicate.

A principal feature of the present invention is the use of a card bearing pulse-width-modulated magnetic signals. The coded signal on the card corresponds to the number of times the card is intended to be used for activating a machine. Each time a machine is activated, the coded number on the card is reduced by one. Along with the data or "credit" signals, as these last described signals are conveniently called, there are provided additional signals called identification signals. The identification signals are employed to validate the card. Means are also provided to visually display a number which shows the remaining number of times the card may be used each time the card is inserted in the apparatus.

In addition to being pulse-width-modulated, the magnetic signals may also be sawtooth-modulated. Sawtooth-modulated signals provide a degree of security against fraudulent duplication in that they tend to be more difficult to analyze and duplicate using known techniques.

DESCRIPTION OF THE DRAWINGS

The above and other objects, features and advantages of the present invention will become apparent from the following detailed description in which FIG. 1 is a top plan view of a typical card used in accordance with the present invention.

FIG. 2 is an exploded perspective view showing a portion of the reader used to read the card.

FIG. 3 is a perspective view showing the reader assembled and a card about to be inserted.

FIG. 4 is a vertical sectional view, somewhat schematic, through the reader taken substantially along the line 4—4 of FIG. 3.

FIG. 12 is a block diagram of the apparatus of FIG. 2.

FIGS. 13a-f are pulse diagrams representing the operation of the apparatus of FIG. 2.

FIG. 14 is a schematic of a first embodiment of the apparatus of FIG. 2.

DETAILED DESCRIPTION

Figure 5:
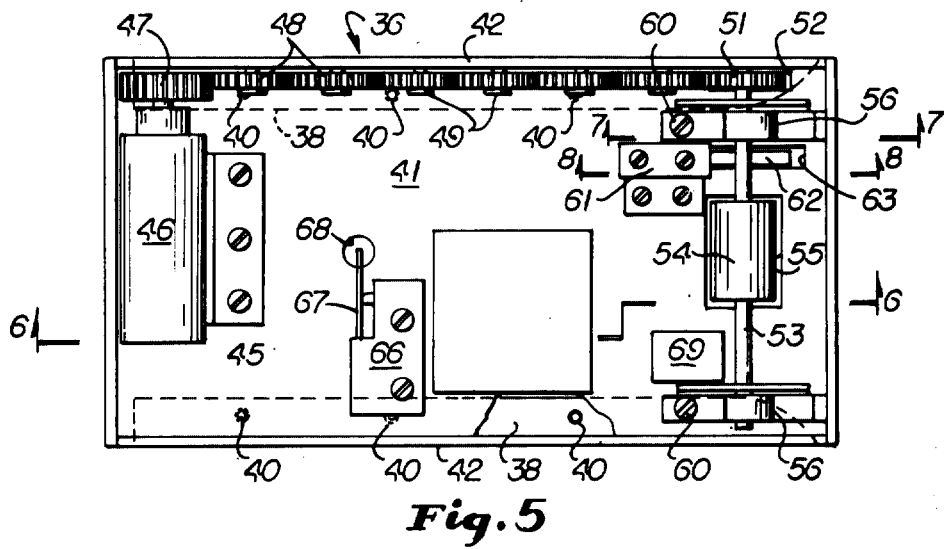
FIG. 5 is a horizontal sectional view taken substantially along the line 5—5 of FIG. 4.
Figure 6:
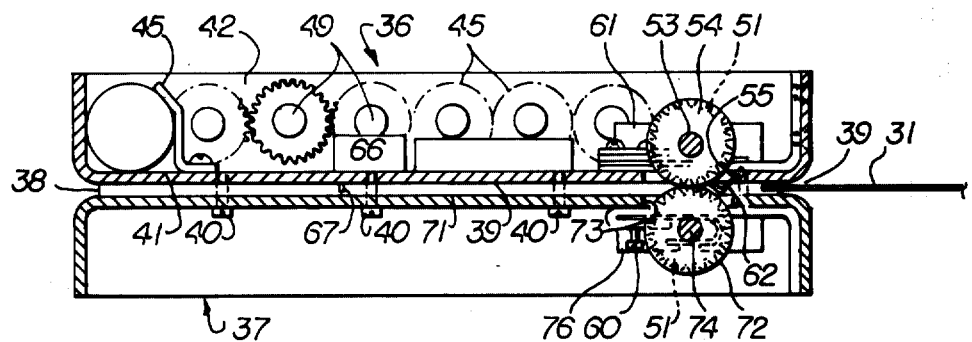
FIG. 6 is a vertical sectional view taken substantially along the line 6—6 of FIG. 5.

Referring to FIG. 2, the control system of the present invention is housed typically in a coin box 21. Coin box or housing 21 is shown as a rectangular box, which may be mounted on a vending machine, a laundry or dry cleaning machine or the like in the same manner as the housings of conventional coin mechanisms are presently mounted. Housing 21 shown in FIGS. 2 and 3 is a rectangular metallic box of a type commonly used with coin acceptors in automatic laundry equipment. A pair of vertically spaced apart openings 22 is formed in the front panel 23 thereof. A feature of the present invention is the fact that it is adapted to fit into such a housing 21 without modification, it being understood that other boxes may be substituted. Indeed, the apparatus of the present invention may be placed in such conventional housings and thereby effect a substantial savings in costs of manufacturing. Alternatively, the apparatus may be mounted in the interior of a machine in any suitable manner so long as an access thereto is provided for the insertion and removal of a card as hereinafter described.

Considering the housing 21 of FIG. 2, there is provided in housing 21, a front panel 27. In panel 27 there is provided a card-receiving slot 28. Slot 28 is provided for receiving a card 31 on which is encoded a plurality of magnetic signals 33 and, typically, a sufficient amount of identifiable indicia for identifying the nature of the card and the manner in which it is used as described more fully with respect to FIG. 1. In applications other than those involving vending machines and the like, the card 31 may take the form of a tape or other equivalent structure.

Referring to FIG. 1, there is provided on card 31 a strip 32. Strip 32 comprises any suitable material on which magnetic signals may be encoded. As presently conceived for use in laundromats, the magnetic signals encoded on strip 32 correspond to a first number, identified as a data or credit number 16 and an identification number 17 preceded and followed by a series of zero's 18 and 19. In addition to the strip 32, there is provided on the face of card 31, a visual indicator 34, such as an arrow, for showing the direction in which the card 31 is properly inserted in the slot 28.

The numbers 16 and 17 encoded on strip 32 of card 31 serve to identify the card as a valid and usable card. More specifically, the number 16 corresponds to the number of times the card 31 may be used to activate a machine. The number 17 corresponds to a predetermined number which serves to identify a valid card. For example, similar cards may be employed for activating different types of machines having different operating prices. In those cases, the number 16 will prevent inadvertent use of the wrong card in a machine. The zero's 18 and 19 may be replaced by other signals if, for example, an expansion of the fields for the numbers 16 and 17 becomes necessary.

Referring to FIG. 12, immediately interiorly of slot 28, there are provided motor-driven rollers 54 and 72. There is also provided a magnetic head 69 for "reading" the magnetic signals on the card 31. The head 69 is also used for recording signals. Positioned in a location to be contacted by the card 31, there are provided a forward switch 61 and a limit or reversing switch 66. Coupled to the head 69 and switches 61 and 66 there is provided a control circuit 20, which will be described herein after in more detail, for controlling a machine 24.

Fitting into the box 21 is a reader 26 having a front panel 27 compatible with panel 23 and formed with a slot 28 for reception of a card 31. Also formed in panel 27 is a display window 29 through which the patron may observe the number of credits (i.e., the number of times which a washing machine may be energized in accordance with the amount paid in the purchase of the card) at the beginning and at the completion of each use of the card.

Reader 26 comprises a top casing 36 horizontally disposed and having its forward end attached to panel 27 and a bottom casing 37 there-below and held parallel and spaced apart by one or more shims 38 so that a gap 39 exists between the casings 36 and 37 which is in registry with the slot 28 and is dimensioned to accommodate passage of a card 31. Screws 40 spaced along the longitudinal edges of casings 36 and 37 pass through holes in shims 38 and hold casings 36 and 37 assembled. The spacing between shims 38 is equal to the width of card 31. The forward edges of shims 38 curve outwardly to facilitate insertion of cards into gap 39.

Figure 7:
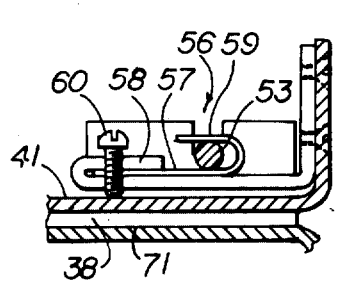
FIGS. 7 and 8 are fragmentary sectional views taken substantially along the lines 7—7 and 8—8 respectively of FIG. 5.
Figure 8:
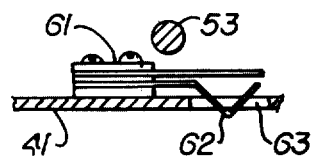

Top casing 36 has a base 41, upstanding sides 42 and is preferably closed with a cover 43. Mounted extending transversely by means of a clamp 45 fastened to base 41 is a miniature motor and reduction gear combination 46 which is preferably D.C. operated and reversible. Pinion 47 is mounted on the outer end of the final shaft of motor and reduction gear 46 and pinion 47 drives a train of gears 48 which are affixed to one of the sides 42 by means of a series of pins 49. The final gear 51 of the train of gears is rotatably mounted on the forward end of top casing 36 and fits through a slot 52 in the base 41 to engage a similar gear 51 in bottom casing 37 as hereinafter explained. Gear 51 also turns horizontal transverse shaft 53 on which is mounted a rubberized roller 54 which fits into gap 39 through a slot 55 cut in base 41. Shaft 53 is flexibly mounted by means of two mounting brackets 56 shown in detail in FIG. 7. Each bracket 56 has a spring 57 held down by member 58 and formed with a reverse bend 59 into which the shaft 53 fits. Screw 60 (FIG. 7) adjusts the roller spring to set the pressure between the top and bottom rollers 54, 72. The mounting 56 permits the roller 54 to be moved slightly upward when a card 31 passes through the gap 39. It exerts sufficient downward force on roller 54, however, so that the card 31 is driven into the gap 39.

Also mounted in top casing 36 is a microswitch 61 having a switch arm 62 which extends down through a hole 63 in base 41 into the gap 39. When a card 31 is inserted through the slot 39 and into the gap 39, it engages arm 62 so that switch 61 starts motor 46 in forward direction. Spaced rearwardly on base 41 is a second microswitch 66 having a switch arm 67 extending into gap 39 through hole 68. When the card 31 is driven rearwardly through gap 39 until it contacts arms 67, switch 66 reverses motor 46 and causes the roller 54 which still engages the card to reverse the direction of movement thereof and discharge the card through slot 28.

Lower casing 37 has a base 71 in which is rotatably mounted bottom roller 72 which is similar to roller 54 and which projects through a slot 73 formed in base 71 and rotates on a shaft 74 which carries the gear 51 mating with the gear 51 of casing 36. Shaft 74 may be mounted by means of mountings 76 which resemble the mountings 56 of casing 36.

Likewise mounted on panel 27 is a bracket 78 for a plurality of electronic components 79 including the power supply and one or more printed circuit boards (not shown) located in bracket 37.

Mounted on base 41 is transducer (head) 69 which is located over the path of movement of strip 32. The electronic system used with the head 69 is explained in detail hereinafter in this specification.

In operation, a card 31 is inserted through the slot 28 and contacts the switch 61. The switch 61 generates a start signal on a line 176. The start signal generates a motor control signal on line 177 causing the rollers 54 and 72 to be driven in a forward direction, transporting the card 31 past the head 69 until the card 31 contacts the limit switch 66. When the card 31 contacts the limit switch 66, a reverse signal is generated on a line 178 generating a second signal on the line 177 causing the rollers 54 and 72 to be driven in a reverse direction expelling the card 31 from slot 28. If the capacity of the card 31 to activate a machine has been exhausted, the reverse signal, in that instance, could be used to cause the card to be driven into a refuse container by any suitable means (not shown).

As the card is driven in the forward direction, the signals on the card 31 are "read" by the control circuit 20 on a line 179. If the card is valid and usable in the specific machine in which it is inserted and its capacity to activate the machine has not been exhausted, a start signal is generated on a line 180 for activating the machine 24.

Referring to FIGS. 13a-f, the magnetic signals encoded on the strip 32 of card 31 are pulse-width-modulated and are best illustrated by representations of pulses of varying widths. As used herein, each magnetic signal corresponds to a binary bit or number (e.g., a "one" or a "zero"). For simplicity, each bit is considered as occupying a bit cell or field of predetermined length. A one is chosen to be represented by a pulse occupying one-fourth or 25% of a cell and a zero is chosen to be represented by a pulse occupying three-fourths or 75% of a cell, as shown in FIG. 13a. Clock pulses, which are generated from the leading edge of the one and zero pulses, as will be described in detail below, are chosen to occupy one-half or 50% of a cell, as shown in FIG. 13e.

As one and zero magnetic signals are transported past head 69, positive and negative pulses corresponding, respectively, to the leading and trailing edges of the magnetic signals are generated on the line 179 as shown in FIG. 13b. From the pulses of FIG. 13b there are generated by means described below, corresponding positive and negative pulses, as shown in FIGS. 13c and 13d. It will be noted that the negative pulses trail the positive pulses with which they are associated to a greater or lesser extent depending on whether the corresponding magnetic pulses are a one or a zero. As will become apparent, the control circuit 20 distinguishes between the one's and the zero's by the correspondence which exists or fails to exist between the negative pulses of FIG. 13d and the clock pulses of FIG. 13e, as shown in FIG. 13f.

Referring to FIG. 14, there is provided, coupled in parallel to head 69, a pair of voltage comparators 130 and 131. Comparators 130 and 131 respond, respectively, to the positive and negative pulses appearing on line 179. Coupled in series to comparators 130 and 131 is a pair of one shots 132 and 133.

One shot 132 is provided to output a clock pulse, as shown in FIG. 13e, for each of the positive pulses of FIG. 13b detected by comparator 130. One shot 133 is provided to output a pulse, as shown in FIG. 13d, corresponding to each of the negative pulses, as shown in FIG. 13b, detected by comparator 131. The outputs of one shots 132 and 133 are coupled to the inputs of a flip-flop 134. The output of one shot 132 is also coupled to the clock or shift input of a serial-to-parallel shift register 135. The data input of register 135 is coupled to the output of the flip-flop 134.

Coupled in parallel to the register 135 is a subtractone circuit 136, and an identification circuit 137. Circuit 136 is coupled to that portion of the register 135 which contains the data or "credit" number 16 for providing an output corresponding to that number reduced by a predetermined amount, such as one. The circuit 137 is coupled to the register 135 for both validating the number 17, which is located in an adjacent portion of the register and to determine whether the number 16 in the register is such as to allow an activation of the machine 24. If the numbers 16 and 17 in register 135 are suitable, an enable signal is generated on a line 138 on the output of circuit 137. In a typical application, the enable signal thus generated is applied to a start flip-flop or a corresponding start circuit 139 to activate a machine.

In some applications, it is desirable to visually display the initial and remaining number of times a machine can be activated with the same card. Accordingly, there is provided a gate 180 having one input coupled to the register 135 and a second input coupled to the output of circuit 136, a display driver 140 and a visual display device 141, such as a conventional seven-segment display. The display is provided for selectively displaying the number 6 in the register 135 or the output of the circuit 136 under the control of a gate enable signal on a line 181 generated from a card reverse signal. While the display device 141 may be positioned in any suitable location, it is preferably located for viewing through a window 29 in the front panel 27 of reader 26 as seen in FIG. 2.

Thus, in operation, the initial number 16 is displayed and thereafter when the reverse signal is generated, the initial number less one is displayed under the control of the gate 180.

In order that the card 31 may be used repeatedly, the magnetic signals on the card corresponding to the number 16 are changed (i.e., reduced) each time the card is used.

To change the number 16 on the card 31, there is provided a parallel-to-serial shift register 150. The input to register 150 is provided via two sets of parallel lines 151 and 152 coupled, respectively, to the output of that portion of register 135 containing the identification number 17 and the output of the subtract-one circuit 136.

To shift the data in register 150 for modification of the number 16 on the card 31 after each use, there is provided an input circuit 161 for receiving a "card-reverse" signal from the card reverse switch 66. Circuit 161 is provided to output a signal for starting an internal clock 162 and enabling a gate 163 and a head driver 164. This signal, as previously described also switches the gate 180 for changing the number displayed in the device 141 from the initial number 16 to the number at the output of the subtract-one circuit. The output of clock 162 is coupled to a pulse-width modulator 165 and also to the gate 163 via a divide-by-four circuit 166 for shifting the data in register 150 serially through the modulator 165. The output of modulator 165 is coupled to the head driver 164 either directly or through a sawtooth modulator 167 as shown. If included, the sawtooth modulation of the output of modulator 165 will shape the pulse width modulated magnetic signals recorded on the card 31 in a manner which, it is believed, will tend to make much more difficult the analysis of the signals on the card using conventional magnetic transducers and, consequently, will provide a greater degree of security against the fraudulent duplication of the cards 31 by known forgery techniques.

Figure 15:
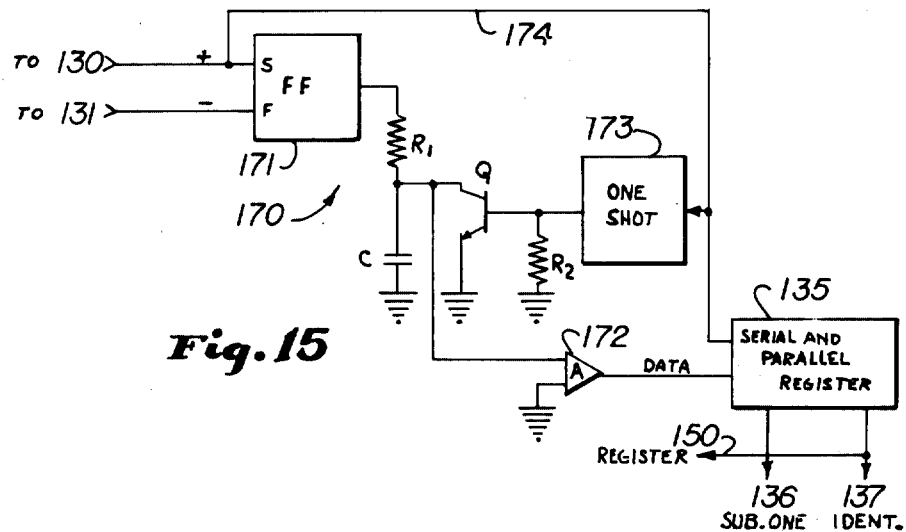
FIG. 15 is a partial schematic of a second embodiment of the apparatus of FIG. 2.

Referring to FIG. 15, there is provided for use in place of the one shots 132, 133 and 134 of the circuit of FIG. 14 an alternative decoding circuit 170. In circuit 170 there is provided a flip-flop 171 having a set input S for coupling to the output of voltage comparator 130 and a reset input R for coupling to the output of voltage comparator 131. To the output of flip-flop 171, there is coupled in series to ground a resistor $R_1$ and a capacitor C. Coupled in parallel with capacitor C is a grounded emitter transistor Q having a base resistor $R_2$ and an operational amplifier 172. Coupled to the base of transistor Q is the output of a one short 173. The input to one shot 173 is coupled to the output of voltage comparator 130 via a line 174. The output of voltage comparator 130 is also coupled via the line 174 to the clock/shift input of the register 135. The data input of register 135 is coupled to the output of amplifier 172.

In operation, the output of amplifier 172 and, hence, the data input to register 135 is a function of the potential on capacitor C at the time of occurrence of each clock pulse.

Figure 16:
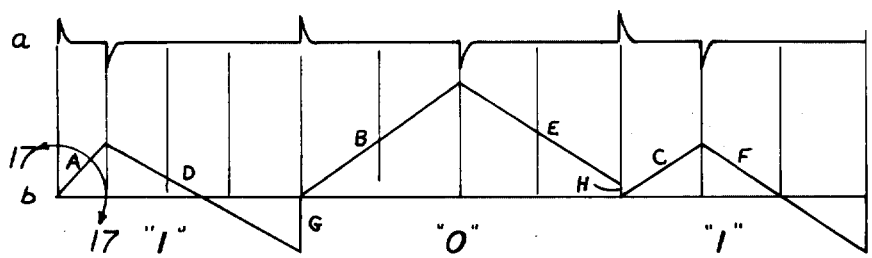
FIG. 16 is a diagram representing pulses and signals in the apparatus of FIG. 15.
Figure 17:
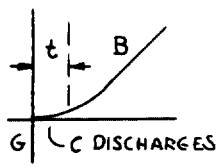
FIG. 17 is an enlarged view of a portion of the diagram within the lines 17—17 of FIG. 16.

Referring to FIGS. 16 and 17, there is provided a representation of an output from head 69 wherein the positive-going pulses are equidistantly spaced and the negative-going pulses are displaced from their associated leading positive-going pulse by an amount corresponding to the binary number 101 as described above with respect to FIG. 13.

Referring to the wave form of FIG. 16, upon the occurrence of each positive-going pulse, flip-flop 171 is set and capacitor C begins charging positively as shown by the positive-going portions, A, B, and C of the wave form. Upon the occurrence of each negative-going pulse, flip-flop 171 is reset and capacitor C begins charging with an opposite polarity, as shown by the negative-going portions, D, E and F of the wave form. Capacitor C continues to charge negatively until the occurrence of the next succeeding clock pulse at which time capacitor C is discharged through transistor Q and is returned to a reference potential, such as ground, as represented by the vertical lines G and H and the horizontal line of the wave form.

The amount that capacitor C charges positively and negatively depends on the relative locations of the positive and negative-going pulses shown in FIG. 16. When a pulse represents a one the period of positive-going potential on capacitor C is considerably less than the same period when the pulse represents a zero. Conversely, the periods of negative-going potential under the same conditions are reversed. Consequently, it will be noted that the charge on capacitor C becomes negative (ie.e, below a reference potential, such as ground) as shown by the horizontal line, when the magnetic signal corresponds to a one, but remains poistive (i.e., above the reference potential) when the magnetic signal corresponds to a zero.

The output of amplifier 172, which tracks the change in potential on capacitor C, provides, as previously described, the data input to register 135 under the control of the clock pulses. The clock pulses also "reset" the capacitor C (that is, discharge it to a reference potential). The discharging of capacitor C is, however, not instantaneous. As shown in FIG. 17, there is actually a brief period t during which the output of amplifier 172 does not change significantly with the occurrence of a clock pulse and, accordingly, the values of resistors $R_1$ and $R_2$, capacitor C and the characteristics of transistor Q and amplifier 172 are chosen to insure sufficient time to clock the data into register 135.

Figure 18:
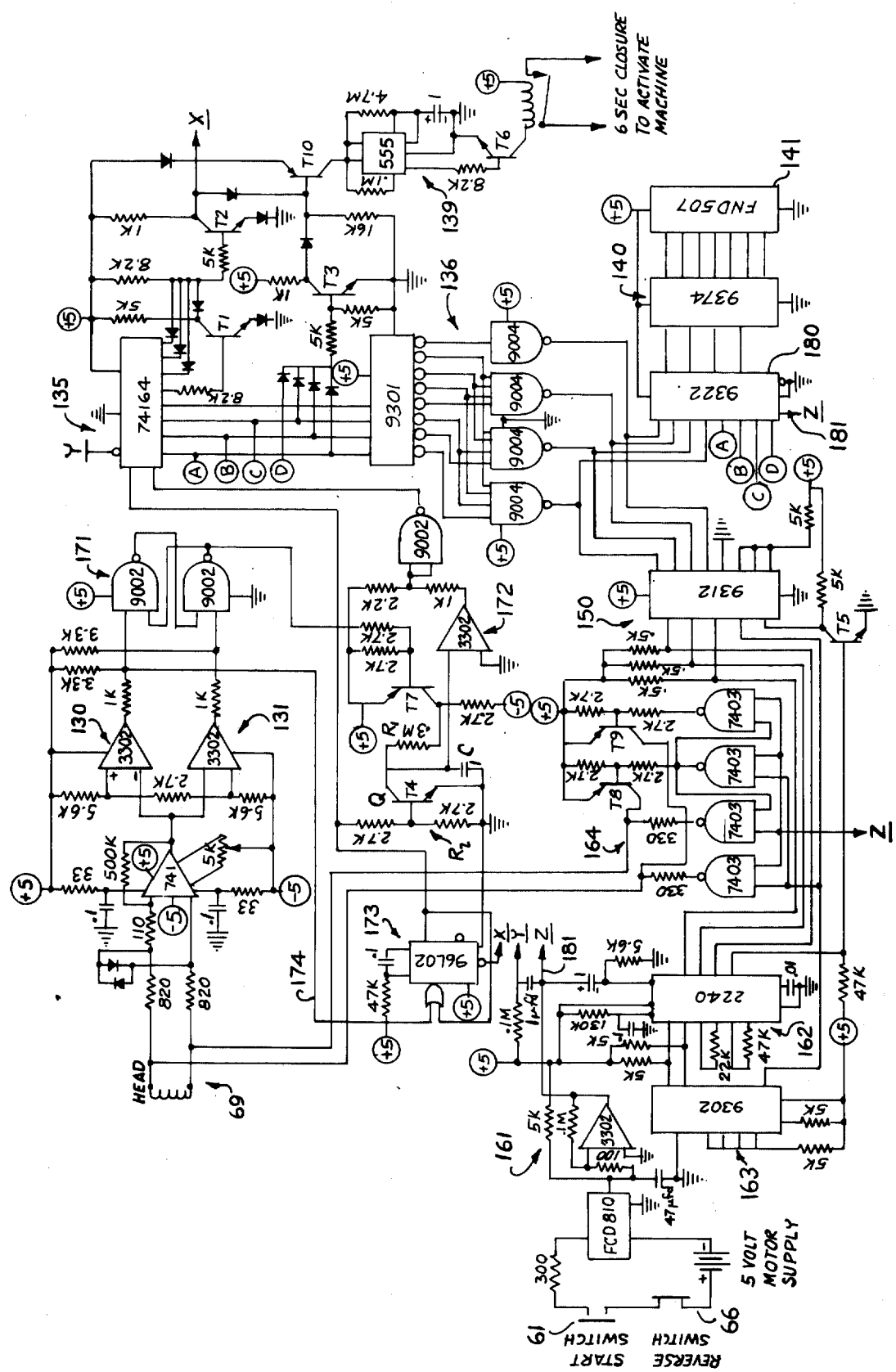
FIG. 18 is a schematic view of the apparatus of FIG. 14 as modified by the apparatus of FIG. 15.

Referring to FIG. 18, there is provided a schematic of the circuit of FIG. 14 as modified by the circuit of FIG. 15. In FIG. 18, the principal circuit components shown in block form comprise conventional integrated circuit components which are commercially available under the device type designation provided from a number of sources as follows:

| Device Type | Source |
| --- | --- |
| 3302 | Fairchild |
| 9002 | ″ |
| 74164 | ″ |
| T1–T6 211 3904 | ″ |
| 9374 | ″ |
| T7–T10 2N3906 | ″ |
| 9302 | ″ |
| 96L02 | ″ |
| 741 | ″ |
| 9301 | ″ |
| 9322 | |
| 2240 | EXAR |
| 7403 | Fairchild |
| 9312 | ″ |
| 9004 | ″ |
| 9004 | ″ |
| 555 | Signetics |
| FND 507 | Fairchild |
| FCD 810 | ″ |

While each of the principal features of the circuits of FIGS. 14 and 15 are identified in FIG. 18 for convenience by corresponding numerical designators, it will be helpful to note that the functions of the clock 162, divider 166, pulse width modulator 165, gate 163 and register 150 of FIG. 14 are incorporated in and performed by the integrated circuits and associated circuitry designated 162, 163 and 150 in FIG. 18. The consolidation of their functions as described is a result of the use of integrated circuits. It is, of course, understood that other circuit arrangements may be employed to perform the same function.

Figures 9, 10, 11:
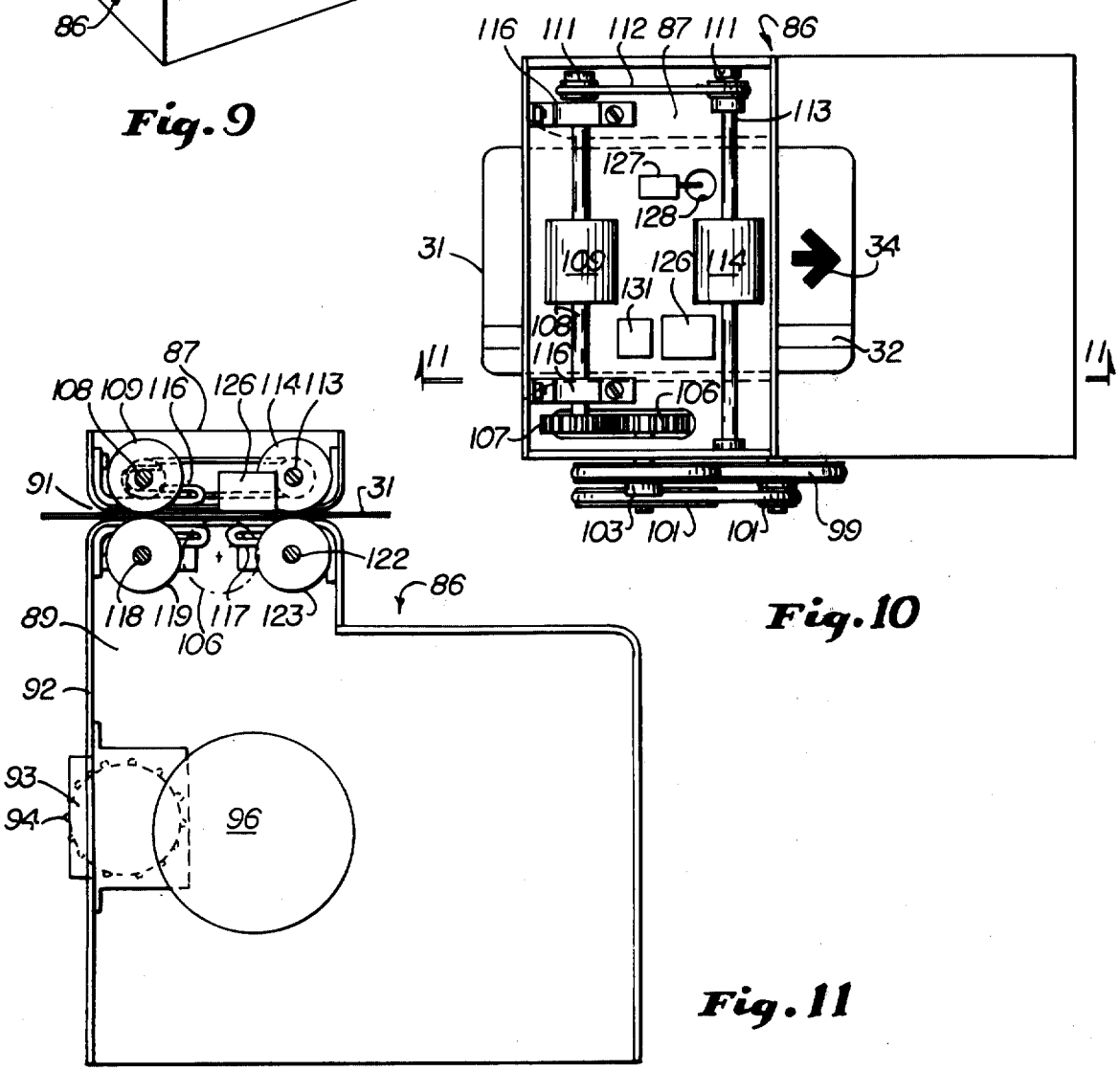
FIG. 9 is a perspective view of an encoder used in accordance with the invention.
FIG. 10 is a horizontal sectional view taken substantially along the line 10—10 of FIG. 9.
FIG. 11 is a vertical sectional view taken substantially along the line 11—11 of FIG. 10.

Encoder 86 (FIGS. 9–11) is used to encode cards 31. Such encoder is located at a central point where suitable security exists. Top casing 87 is closed with a top cover 88 and mounted above bottom casing 89 with a gap 91 dimensioned for card 31. Bottom casing 89 has a front panel 92 formed with an indicator window 93 surrounded by a bezel and also having extending therethrough the perimeter of a wheel 94 which may be manually adjusted for a given number of credits to be encoded onto the card 31. Within casing 89 is a motor 96 having a shaft 97 here shown as projecting out one side of casing 86 and carrying a drive pulley 98 which, through belt 99, drives a plurality of speed reduction idler pulleys 101 mounted on the outside of casing 86 through belts 102. The final shaft 103 extends into the casing 89 and carries on its inner end a gear 106 which mates with a gear 118 on front bottom transverse horizontal shaft 118 on which is mounted bottom roller 119. Shaft 118 carries a gear (not shown) which meshes with gear 107 on top front transverse horizontal shaft 108, appropriate holes being formed in the casing so that the gears can mesh. Front top roller 109 is fixed to shaft 108. Shaft 108 also carries one of a pair of pulleys 111 which are connected together by belt 112, the rearward pulley 111 being fixed on rear top shaft 113 which also carries a rear top roller 114. Rollers 109 and 114 extend down through slots in the bottom of casing 87 into the gap 91 through which card 31 passes. Top shafts 108 and 113 are mounted on casing 87 by means of supports 116 which resemble the support 56 shown in FIG. 7. In bottom casing 89 are similar supports 117 for bottom front shaft 118 which carries bottom front roller 119 which mates with roller 109. Bottom rear shaft 122 is driven from shaft 108. Shaft 122 carries a roller 123 which mates with roller 114.

Mounted in casing 87 is a magnetic record head (transducer) 126 which is positioned to magnetically act upon the strip 32 of card 31. A photocell 127 and exciter lamp mounted in casings 87 and 89 has an upper element which views through a hole 128 in casing 87. Motor 96 drives rollers 109, 114, 119, 123 continuously while the encoder is operating. The photocell and lamp 127 operating together indicate when card 31 is in proper position with respect to head 126 gap and at such time the electrical components hereinafter described generate the appropriate binary number (determined by the manual setting of selector switch 94) to be recorded on card 31.

When the recording machine is turned on, the rollers 109, 119, 114, 123, which draw card 31 into the encoder 86 and push it out are continuously turning so that any time a card 31 is inserted, it is immediately pulled through the machine. When the leading edge of card 31 reaches photocell 127, it interrupts light from the exciter lamp and, in turn, activates the rest of the circuitry.

The specific circuitry for encoding pulse-width-modulated signals on card 31 in response to the output of photocell 127 comprises essentially the same components as are employed in the signal recording portions of the decoder circuitry described above with respect to FIGS. 14 and 18. The minor differences which may be noted include the use of a digital switch or the like for setting the desired numbers in an input register corresponding to the decoder register 150 and the fact that the encoder does not include the "signal reading" structure employed in the decoder for decoding the signals. It should be understood, however, that other means well known to those skilled in the art may be employed for encoding the card 31 with the necessary pulse-width-modulated signals.

When pulse-width modulated signals and other forms of signals are encoded on a magnetic recording medium, it is convenient, when considering the signals on the medium, such as card 31, to consider them as comprising a plurality of magnetic dipoles having an axis parallel to the axis of the recording head used for recording them. In the embodiments of the present invention described above, the axis of the recording head is perpendicular to the direction of travel of the card in the apparatus. Consequently, the axis of the dipoles encoded on the card is also perpendicular to the travel of the card. This orientation of the magnetic recording and reproduction heads and the magnetic dipoles encoded on the card with respect to the travel of the card is relatively conventional. However, it it known that certain advantages can be obtained by skewing the magnetic recording and reproduction heads relative to the direction of travel of the recording medium.

One of the principal advantages in skewing a head is an improvement in signal discrimination. This is because the output of a reproduction head varies as a function of the wave length of the recorded signal and the angle by which the head is skewed from the axis of the magnetic dipoles forming the signal. Therefore, the signal level generated from a dipole having an axis which is not parallel to the head will be low.

Figure 19:
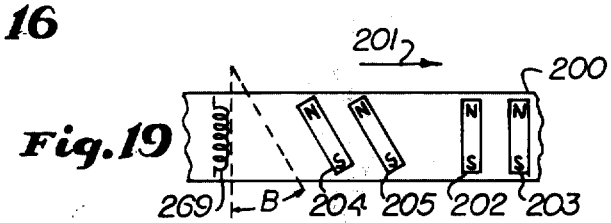
FIG. 19 is a diagram of skewed and non-skewed magnetic dipoles on a magnetic recording medium.

Referring to FIG. 19, there is shown a length of magnetic tape 200. Tape 200 corresponds to the magnetic strip 32 on the card 31. The tape 200 is given an assumed direction of travel in the direction of the arrow 201. Orientated at an angle perpendicular to this assumed direction is a head 269. Head 269 corresponds to the head 69 of FIGS. 14 and 18 and to a head similarly orientated which is in the encoder.

In response to the moving strip, the head 269 will decode magnetic dipoles on the strip 200. Those dipoles with an orientation parallel to the axis of the head, such as, for example, the dipoles designated 202 and 203 will provide a maximum output from the head. However, other signals in the form of dipoles, such as dipoles 204, 205 may also be on the strip. These dipoles, for example, may have an orientation with respect to the head 269 which describes an angle B. Such signals may result, for example, from noise in the recording circuitry.

Figure 21:
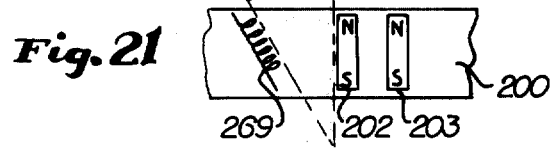
FIG. 21 is a diagram of a skewed head and magnetic dipoles having an axis describing an angle B relative to the head.
Figure 20:
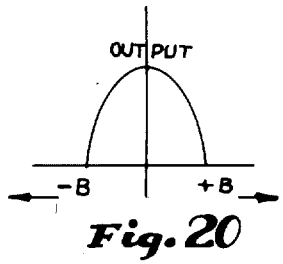
FIG. 20 is a diagram of the output of a reproduction head versus an angle B between the head and the axis of magnetic dipoles detected by the head.

Referring to FIG. 20, there is shown a diagram of the output signal of the head 269 versus the angle B. From the diagram it can be noted that the output signal from the head is maximum when the angle B is zero and falls off sharply with an increasing angle B in either a positive or negative direction. It follows from the diagram that for a sufficiently large angle B between a recorded dipole, such as the dipoles 204 and 205, and the head, that the output of the head will be very low, if not zero. It further follows from the foregoing that if the head 269 is skewed initially in the recording or encoding of signals on the card 31, as shown in FIG. 21, the output of a reading head not similarly skewed will be very low, if not zero, for signals such as dipoles 202 and 203 which are recorded with the conventional perpendicular orientation. Consequently, by skewing the head 269, signals not having the preferred orientation will be discriminated against.

In addition to discriminating against extraneous magnetic signals having an orientation other than parallel to the axis of the reading head, the skewing of the reading head to read intentionally skewed recorded signals has the further advantage of reducing the usability of fraudulently duplicated cards in the apparatus of the present invention. This advantage arises from the nature of the techniques most commonly employed for that purpose. The techniques referred to typically employ a transfer process in which the signals on one medium are transferred to a second medium. During the transfer process, the signals resulting on the second medium are the mirror image of the signals on the first medium with a corresponding reversal in the polarity of the signals.

Figure 22:
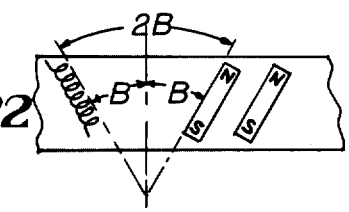
FIG. 22 is a diagram showing the relationship between a skewed head according to the present invention and a fraudulently fabricated magnetic card.

Referring to FIG. 22, there is shown a duplicated card fabricated according to the techniques described in which the orientation and polarity of the dipoles 204 and 205 are the mirror image of the same dipoles in FIG. 19. Dipoles 202 and 203 are omitted for clarity. When a card usable in the present invention is duplicated using these techniques and thereafter an attempt is made to use the card in the apparatus of the present invention, the angle between the axis of the head and the axis of the duplicated dipoles, as seen in FIG. 22, is such that for a given angle B no signal is generated in the head. Consequently, the employment of skewed recording and reproduction heads in the present invention will provide an effective means for preventing at least one form of unauthorized use of the apparatus.

While a number of embodiments of the present invention have been described and a number of modifications suggested, it is understood that still other changes are possible and will undoubtedly occur to those skilled in the art without departing from the spirit and scope of the present invention.

Accordingly, it is important that the description provided herein be considered only as illustrative of preferred embodiments and that it not be construed as limiting the invention, the scope of which is intended to be determined by the claims hereinafter provided.

What is claimed is:

1. An apparatus for activating a machine with a magnetic member bearing magnetic signals representing one's and zero's, said magnetic signals having leading and trailing edges, a first predetermined duration when representing a one, a second predetermined duration when representing a zero, and leading edges which are equidistantly spaced, comprising:
    means responsive to said magnetic signals for generating pulses of a first polarity corresponding to each of said leading edges and pulses of an opposite polarity corresponding to each of said trailing edges;
    means responsive to said pulses of said first polarity for generating clock pulses, said clock pulses having a duration between that of said magnetic signals representing one's and said magnetic signals representing zero's;
    means responsive to said clock pulses and said pulses of opposite polarity for generating data pulses and
    a first registering means responsive to said data pulses and said clock pulses for registering said data pulses, said data pulses representing a data number and an identification number;
    means coupled to said first registering means for validating said data number and said identification number and providing an enabling signal when acceptable data and identification numbers are present;
    means coupled to said first registering means and responsive to said data number for reducing said data number and providing an output corresponding to said reduced data number;
    means coupled to said reducing means and said validating means and responsive to said enabling signal for displaying said reduced data number;
    means responsive to said enabling signal for activating a machine;
    a second registering means coupled to said first registering means and said reducing means and responsive to said enabling signal for registering said reduced data number and said identification number; and
    means coupled to said second registering means for recording on said magnetic member, in place of the original magnetic signals, new magnetic signals corresponding to said identification number and said reduced data number, said magnetic signals having a first predetermined duration when representing a one, a second predetermined duration when representing a zero, and leading edges which are equidistantly spaced.

2. An apparatus according to claim 1 wherein each of said magnetic signals have leading edges and trailing edges, said data pulses are generated in response to said trailing edges and said trailing edges trail associated leading edges by a first amount when said signals represent a number "one" and by a second amount when said signals represent a number zero.

3. An apparatus according to claim 2 wherein said means for activating a machine comprises:
    means responsive to said data pulses for registering said first and said second numbers; and
    means for comparing said first and said second numbers with said predetermined criteria, said predetermined criteria being a valid and acceptable number corresponding to said identification number and a first number corresponding to at least one remaining use of said magnetic member for activating a machine.

4. An apparatus according to claim 3 further comprising:
    means for reducing said first number each time a machine is activated using said magnetic member;
    means for displaying said reduced first number whereby a user thereof is able to determine the number of times said magnetic member may still be used for activating a machine; and
    means for recording pulse-width-modulated magnetic signals corresponding to said identification number and said reduced first number on said magnetic member in place of the original magnetic signals corresponding to said first and said second numbers.

5. An apparatus according to claim 4 wherein said recording means comprises:
   means for registering said identification number and said reduced first member;
   a pulse-width modulator; and
   a clock means for clocking said identification number and said reduced first number through said modulator and outputting corresponding pulse-width-modulated pulses.

6. An apparatus according to claim 5 further comprising a sawtooth modulator for sawtooth modulating said pulse-width-modulated pulses.

7. The apparatus of claim 1 wherein said magnetic member has a longitudinal axis, and said magnetic signals are skewed relative to said axis at an angle alpha, and wherein said apparatus further comprises means for transporting said magnetic member in a direction parallel to said axis, and wherein said means responsive to said magnetic signals comprises a reader having a reader head skewed relative to said longitudinal axis at angle alpha for discriminating against any magnetic signal on said magnetic member except those signals skewed relative to said axis at angle alpha.

8. In an apparatus according to claim 7, the improvement further comprising a card and wherein said medium comprises a magnetic strip affixed to said card.

9. In an apparatus according to claim 8, the improvement wherein said medium on said card comprises magnetic dipoles having a longitudinal axis parallel to said longitudinal axis of said head when said medium is transported past said head.

10. In an apparatus according to claim 9, the improvement wherein said pre-encoded magnetic signals comprise a predetermined number of credits, said number being proportioned to a predetermined number of times said card is usable for activating a machine.

11. An apparatus for use with a magnetic member bearing pulse-width-modulated magnetic signals comprising:
   means responsive to said magnetic signals for generating data pulses representing a first number corresponding to the number of times said magnetic member may be used to activate a machine and a second number corresponding to an identification number; and
   means responsive to said first and said second numbers for activating a machine when said first and said second number satisfy predetermined criteria, wherein said magnetic signals have leading and trailing edges and further wherein said means responsive to said magnetic signals for generating said data pulses comprises: capacitive means;
   means responsive to a first one of said leading edges for changing the potential on said capacitive means from a first predetermined reference potential to a second potential;
   means responsive to a first one of said trailing edges following said first leading edge for changing the potential on said capacitive means from said second potential to a third potential;
   means sensitive to the polarity of said third potential relative to said reference potential for providing a corresponding predetermined output; and
   means responsive to a second one of said leading edges following said first trailing edge for changing the potential on said capacitive means from said third potential to said reference potential.

12. An apparatus according to claim 11 wherein said output of said polarity-sensitive means corresponds to a one when said third potential is of one polarity and to a zero when said third potential is of the opposite polarity.

13. An apparatus according to claim 12 wherein said output of said polarity-sensitive means corresponds to said first and second numbers.

14. An apparatus according to claim 11 wherein said potential-changing means comprises:
   a flip-flop having a set and reset input and an output;
   a resistor and a capacitor coupled in series between said output and ground;
   a grounded-emitter transistor having an input and an output;
   means for coupling said transistor output between said resistor and said capacitor;
   a one shot coupled to said transistor input;
   a differential amplifier coupled to said transistor output in parallel with said capacitor;
   means for coupling said set input of said flip-flop and said one shot;
   means responsive to said leading edges coupled to said set input; and
   means responsive to said trailing edges coupled to said reset input.

15. The apparatus of claim 11 wherein said magnetic member has a longitudinal axis, and said magnetic signals are skewed relative to said axis at an angle alpha, and wherein said apparatus further comprises means for transporting said member in a direction parallel to said axis, and wherein said means responsive to said magnetic signals comprises a reader having a reader head skewed relative to said longitudinal axis at angle alpha for discriminating against any magnetic signal on said magnetic member except those signals skewed relative to said axis at angle alpha.

* * * * *